United States Patent Office 3,427,170
Patented Feb. 11, 1969

3,427,170
SEALING OF SAUSAGE CASINGS
Paul G. K. Schroeder, 28 Island Trail,
Lake Mohawk, Sparta, N.J. 07871
Filed Mar. 8, 1966, Ser. No. 532,689
U.S. Cl. 99—176                         6 Claims
Int. Cl. A22c 13/00

This invention relates to the sealing of flexible sausage casings and similar articles with a longitudinally formed wire having a plastic coating. More specifically, it deals with the sealing of sausage casings with a wire having a periphery shaped in longitudinal convolutions so as to minimize the cold flow of the plastic covering on said wire.

In the packing industry, a tight seal for the closure of the casing is important, particularly where a vacuum has been applied prior to fastening of the casing, such as in the case of poultry and similar products. When sausages and similar packed meat products are considered, it is also essential that they be leakproof during the curing and storing periods.

Wire, particularly metal wire, first has been used in the past for fastening meat, poultry, and sausage casings, particularly in the form of staples. It was subsequently found that such bare wire often caused the cutting of the casings, thus resulting in leaky products. Later, a plastic coated wire was used in an effort to eliminate this cutting action of the bare wire. This coated wire was a round metal wire, generally of aluminum, having a thick coating of a plastic, such as polyvinyl chloride, extruded around it. The thickness of this coating has necessarily been at least three times the thickness of the wire.

The cheaper and softer plastic wire coatings, such as the vinyls, which would ordinarily be employed for this purpose, possess a cold flow characteristic. For example, when a sausage casing has been fastened with wire coated with such plastic, the pressure of the compressed casing against the hard plastic-coated wire gradually causes the plastic to flow away from the area subjected to the pressure. In an effort to overcome this feature, the plastic coating has been made excessively thick, say at least three times the thickness of the wire. However, in a way, this excessive thickness has exaggerated the flow effect, because there was thus more plastic to flow out, thereby leaving a greater open space into which the compressed casing could spread and open, and thus create leakage points, whereby a defective product would result.

According to the present invention, the cold flow effect of the plastic coating on the wire is greatly minimized by shaping the periphery of the wire so as to offer resistance to the flow of plastic. This not only has been found to reduce leakages in fastened sausage ends, but it has also enabled the use of thinner plastic coatings, thus reducing the cost of the coated wire, since it is the wire itself which does the sealing. The coating merely serves to protect the casing from the cutting action of the wire.

The invention will be more readily understood by reference to the accompanying drawing in which a preferred embodiment is described, and in which the same numerals refer to similar parts in the various figures.

Figure 1:
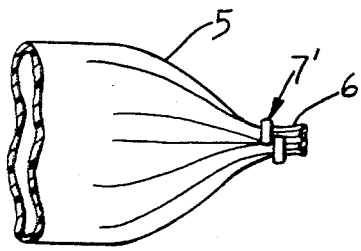
FIGURE 1 depicts a side view of a sausage casing end fastened with a flattened fastener winding of the present invention.
Figure 3:
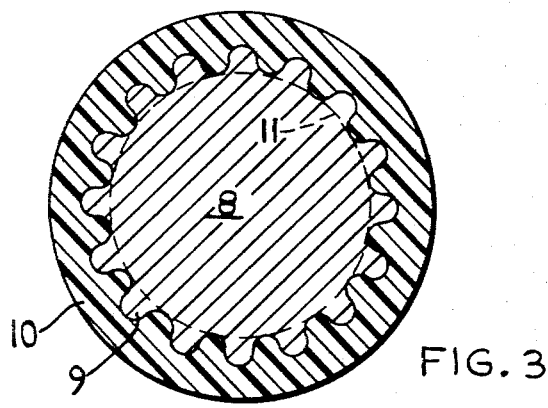

FIGURE 3 presents a cross-sectional view, greatly enlarged, of the same wire used for the sealing of the casing in FIGURE 1.

Referring again to the drawing, numeral 5 depicts a filled sausage casing portion having a narrowed and gathered or pleated end 6, sealed with a coated wire fastener 7' of the present invention. This is usually done by making the wire in the form of staples which are fed into a conventional casing fastening machine, such as the machine described in copending application Ser. No. 511,089, filed on Dec. 2, 1965, by Paul G. K. Schroeder, now U.S. Patent No. 3,350,766.

Figure 2:
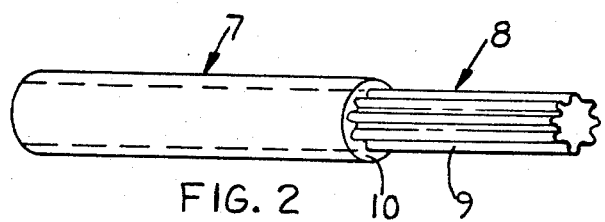
FIGURE 2 illustrates a side view, in enlarged form, of a coated wire used in the invention, a portion of the wire being removed to show the metal core having its periphery shaped to minimize cold flow of the coating.

As can be seen from FIGURES 2 and 3, wire 7, used in the manufacture of fasteners 7', consists of a stiff wire core 8, preferably made of metal, such as aluminum, copper, or the like. It will be noted that the periphery of wire 8 is provided with a longitudinal wavy surface or convolutions, each wave or convolution 9 having a rounded crest so as to avoid cutting into the plastic coating 10.

A suitable wire core 9 may be made by extruding aluminum through a die having the shape of the convoluted periphery 9 in FIGURE 3. It has been found that very deep convolutions are unnecessary and, in fact, undesirable, since the higher the convolutions, past a certain minimum, the less is the strength of the wire, because the greatest strength lies in the thick mass of the core 8. Also, there is greater danger of penetration of such convolutions through the plastic coating. Furthermore, there is a minimum of convolutions required for a given cross-section of wire to serve as an effective impediment to the cold flow characteristic of the plastic.

It is essential that the wire have at least 10 longitudinal convolutions or corrugations on its periphery. The maximum number of corrugations is limited to the ability to make a suitable die, and this value would vary, depending, to some extent, upon the size of the wire. The wire ordinarily used for this purpose has a diameter of 0.090 inch. The preferred periphery for such size is shown in FIGURE 3, wherein there are 16 longitudinal corrugations on the base wire. These may be increased to about 30, without too appreciable a drop in cold flow reduction ability. The height of the corrugations also is important, it being found that a maximum height equivalent to about 10% to about 25% of the inner radius 11 of the wire is most effective. In the case of the wire in FIGURE 3, the maximum height of the convolutions is about 17% over the length of the radius of inner circle 11. The peripheral circumferential length of the convoluted periphery is desirably about 135% to about 170% of the length of the inner circumference 11 of the wire. In the wire shown in FIGURE 3, the convoluted circumference is about 58% greater than the length of the inner circumference 11.

As can be seen from FIGURE 3, the total average thickness of the plastic coating which may be used is considerably less than three times the average diameter of the wire. In fact, it may be even less than the average diameter of the wire, and not more than twice the average diameter.

Although the continuous convolution pattern 9, such as that shown in FIGURE 3, is desirable, it is not especially necessary, and an irregular pattern may be employed, as long as enough convolutions are present on each quadrant of the wire to effect the desired cold flow restriction. Hence it is desirable that the wire have at least 3 convolutions per quadrant, in the case of a round wire. The wire, however, may have different shapes, but the specifications outlined above would apply, by considering the shape as converted to an equivalent circle.

Also, although the convolutions shown in the example are indicated as having the same height, convolutions of different heights may be used, and the values given herein apply to average values.

The plastic wire coating may consists of polyvinyl chloride, polyvinyl acetate, polyethylene, polypropylene, butadiene copolymer, and the like.

From the foregoing description of the invention and its operation, it is apparent that there may be various changes in detail without departing from the spirit of the invention, it being understood that the invention is not to be limited by the example given and described, and therefore, the invention is claimed broadly as indicated by the appended claims.

I claim:

1. A flexible casing having a flexible end sealed by a flattened winding of stiff wire having at least three longitudinal convolutions per quadrant and having a convoluted circumferential length of about 135% to about 170%, as compared to its inner circumferential length, said wire having a plastic coating over its entire convoluted periphery.

2. A flexible casing according to claim 1 in which the total average thickness of the plastic coating is less than three times the average diameter of the wire.

3. A flexible casing according to claim 1 in which the convolutions have a maximum height of about 10% to about 25% of the length of the inner radius of the wire.

4. A flexible casing according to claim 1 in which the wire has about 3 to about 8 convolutions per quadrant.

5. A flexible casing according to claim 1 in which the total average thickness of the plastic coating is less than twice the average diameter of the wire.

6. A flexible casing according to claim 1 in which the convoluted circumference is about 50 to 60% greater than the inner circumference of the wire.

References Cited

UNITED STATES PATENTS 2,670,294   2/1954   Frank _____ 99—176

A. LOUIS MONACELL, *Primary Examiner.*

WILLIAM C. LAWTON, *Assistant Examiner.*

U.S. Cl. X.R.

24—30.5; 99—174, 175; 117—232, 128.4